BIREFRINGENT APPARATUS FOR DEMODULATING PHASE MODULATED LIGHT

Filed March 31, 1965 2 Sheets-Sheet 1

INVENTORS
STEPHEN E. HARRIS
CARL F. BUHRER
BY Samuel Lindenberg
Arthur Frederick
ATTORNEYS

BIREFRINGENT APPARATUS FOR DEMODULATING PHASE MODULATED LIGHT

Filed March 31, 1965 2 Sheets-Sheet 2

INVENTORS
STEPHEN E. HARRIS
CARL F. BUHRER
BY Samuel Lindenberg
Arthur Frelich
ATTORNEYS

United States Patent Office 3,404,353

Patented Oct. 1, 1968

3,404,353

BIREFRINGENT APPARATUS FOR DEMODULATING PHASE MODULATED LIGHT

Stephen E. Harris, Palo Alto, and Carl F. Buhrer, Bayside, Calif., assignors to Research Corporation, New York, N.Y., a corporation of New York Filed Mar. 31, 1965, Ser. No. 444,341
9 Claims. (Cl. 332—1)

ABSTRACT OF THE DISCLOSURE

Apparatus for demodulating a phase modulated light signal by converting it into an amplitude modulated light signal. The phase modulated light signal is first linearly polarized and then transmitted through a first birefringent crystal to thus develop a pair of orthogonally related phase modulated signal components which are shifted in time relative to one another. These two components are equivalent to a pair of orthogonally related amplitude modulated signal components, out of phase by 180° at the modulation frequency. The phase difference between these two components is corrected by transmitting them through a second birefringent crystal which has a length and indices of refraction such that it shifts the two amplitude modulated components relative to one another by approximately 180° at the modulation frequency to thus develop a resultant amplitude modulated signal.

This invention relates generally to a method and apparatus for demodulating frequency or phase modulated light.

The recent development of lasers and other sophisticated light generating and controlling devices has significantly increased the likelihood that optical communication systems using light as the information carrier will in the near future be within the practical engineering realm. Light, in such systems, can be treated substantially in the same manner as electromagnetic waves in the radio frequency range are presently treated. That is, information can be impressed upon a light carrier having a desired wavelength using substantially conventional modulation principles, as for example, frequency or phase modulation. Of course however, new devices have to be developed for actually modulating the light carrier and subsequently demodulating the modulated signal.

Consequently, it is an object of the present invention to provide a method and apparatus suitable for demodulating frequency or phase modulated light.

Inasmuch as it is well known that the characteristics of frequency and phase modulated signals are very similar and that consequently equipment designed primarily to handle one of these types of signals is usually also suitable for handling the other type of signal, further reference herein will be made only to the demodulation of phase modulated signals but it will be understood that the remarks will be applicable to frequency modulated signals also.

Briefly, the present invention is based upon the recognition that a phase modulated light signal can be demodulated by converting it into an amplitude modulated light signal by initially linearly polarizing it and then transmitting it through a first birefringent crystal to thus develop a pair of orthogonally related phase modulated signals respectively corresponding to the crystal's ordinary and extraordinary waves. The two orthogonally related phase modulated signals will of course be shifted in time relative to one another. It is recognized herein that these two orthogonally related phase modulated signals are equivalent to a pair of orthogonally related amplitude modulated signals, out of phase by 180° at the modulation frequency, and oriented about a set of axes shifted by 45° with respect to the principal axes of the first crystal. The phase difference between these two amplitude modulated signals can be corrected by transmitting them through a second birefringent crystal whose principal axes are displaced by 45° with respect to the principal axes of the first crystal. The second birefringent crystal preferably has a length and indices of refraction such that it shifts the phase of the two amplitude modulated signals relative to one another by approximately 180° at the modulation frequency to thus develop a resultant amplitude modulated signal whose amplitude varies in substantially the same manner as the phase of the initial phase modulated light signal.

An apparatus constructed in accordance with the present invention, in addition to demodulating a phase modulated signal, functions to simultaneously suppress or balance out an incident amplitude modulated signal.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2A:
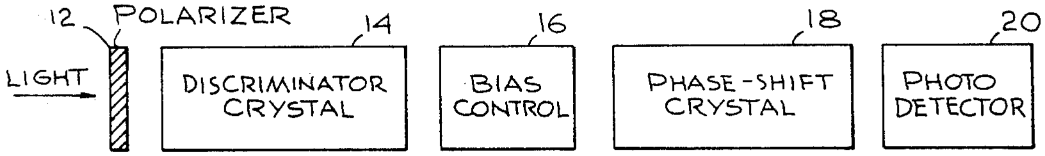
FIGURE 2(*a*) is a schematic block representation illustrating a preferred embodiment of the invention and FIGURE 2(*b*) is a vector diagram showing the polarization relationships between various light signal components occurring within the embodiment.
Figure 2B:
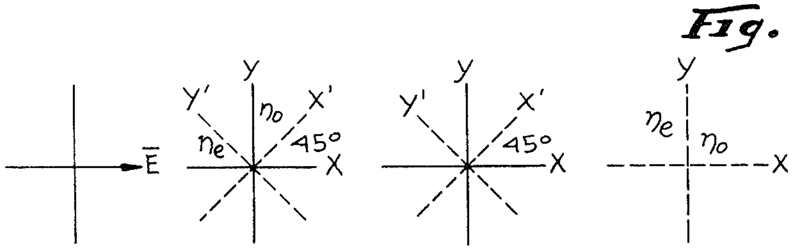
Figures 3A, 3B, 3C, 3D, 3E, 3F:
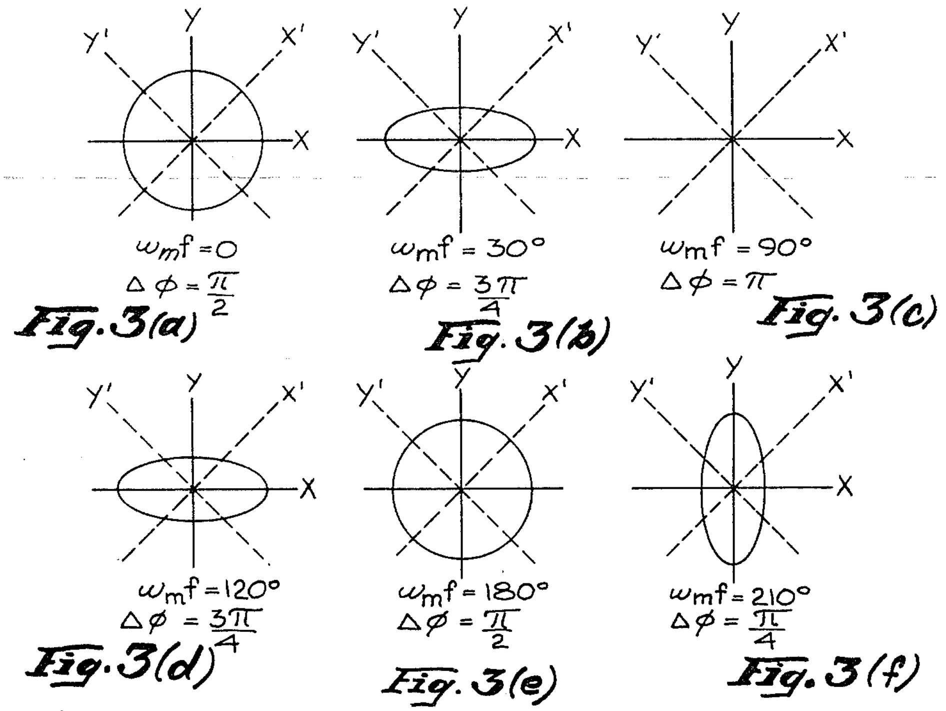
Figure 4A:
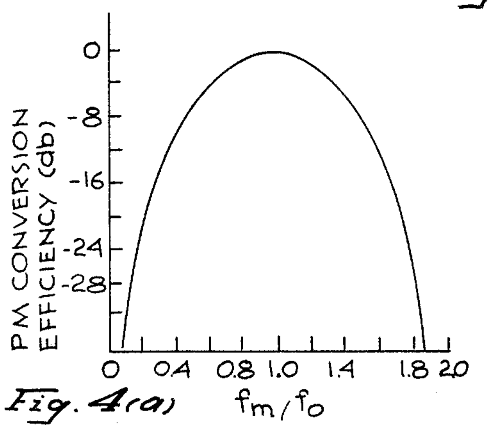
Figure 4B:
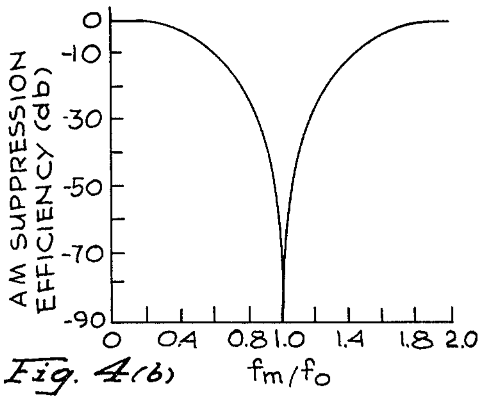
Figure 5A:
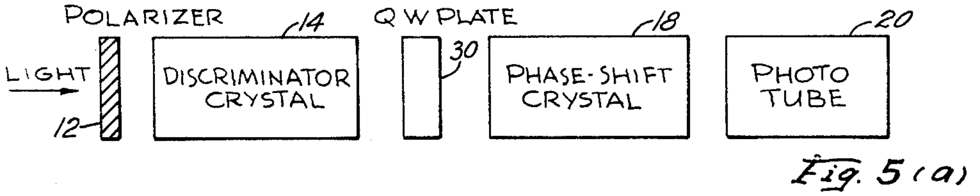
Figure 5B:
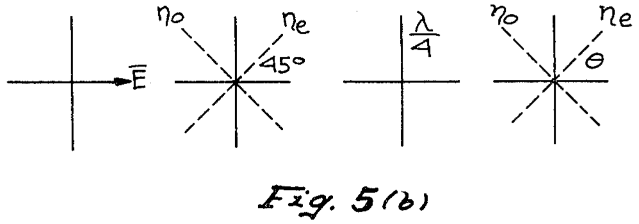

FIGURES 3(*a*)–(*f*) comprise polarization envelope diagrams demonstrating the amplitude modulation characteristics of the signals provided by the discriminator crystal of FIGURE 2;

FIGURES 4(*a*) and (*b*) respectively are charts quantitatively showing the PM conversion efficiency and AM suppression efficiency of the apparatus of FIGURE 2; and FIGURE 5(*a*) is a schematic block representation illustrating an alternative embodiment of the invention; and FIGURE 5(*b*) is a vector diagram showing the polarization relationships between various light signal components occurring within the embodiment.

It is known that the sidebands of a purely phase modulated signal possess certain amplitude and phase relationships among themselves such that the amplitude of the envelope of the signal is independent of time. At lower (radio) frequencies, the demodulation of such a signal is accomplished by first applying it to a network whose transfer function is such that it modifies these phase and amplitude relationships in a manner such that the amplitude of the envelope of the resultant signal fluctuates in the same manner vs. time as did the phase of the original signal. In accordance with the present invention, a phase modulated light signal is similarly demodulated by a "network" which, as shown in FIGURE 2(*a*), includes a number of properly oriented birefringent crystals.

Figure 1A:
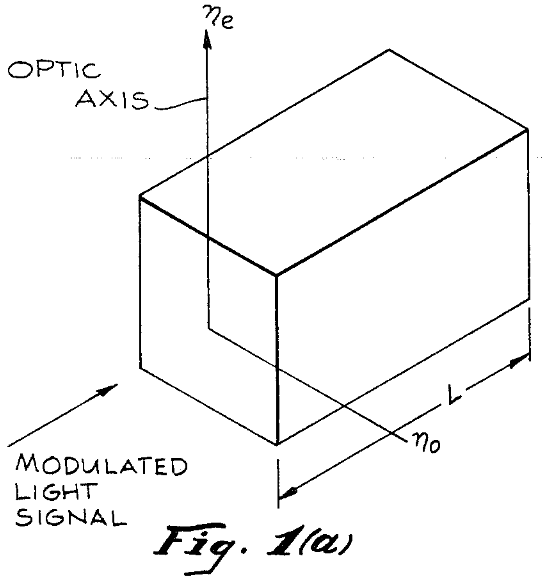
FIGURE 1(*a*) is a schematic representation illustrating a light signal incident on a birefringent crystal and FIGURE 1(*b*) is a vector diagram defining the polarization of the signal with respect to the crystal's principal axes.
Figure 1B:
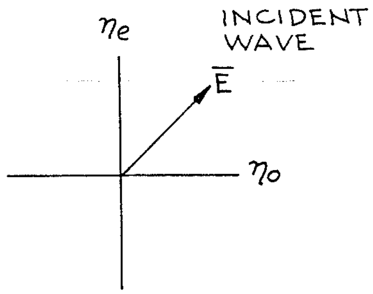

Prior to considering the embodiment of FIGURE 2(*a*), certain background relationships with respect to FIGURES 1(*a*) and (*b*) will be discussed. Assume that a linearly polarized optical signal consisting of a monochromatic carrier and a number of sidebands is incident on a birefringent crystal as shown in FIGURE 1(*a*). The crystal is assumed to be uniaxial and to be cut with its optic axis perpendicular to its length. The light signal is assumed to be polarized at 45° with respect to the optic axis of the crystal and will thus travel through the crystal in the form of equal components of the orthogonally polarized ordinary and extraordinary optical waves. These waves travel with different group velocities and will emerge with a relative time delay given by $$t_e - t_0 = \frac{L\Delta n}{c} + \frac{Lf_c}{c}\frac{d}{df}(\Delta n) \quad (1)$$

where $\Delta n$ is the difference between the extraordinary and ordinary indices of refraction of the crystal, L is the crystal length, and $f_c$ is the optical carrier frequency. For calcite, the first term on the right hand side of Equation 1 is about ten times as large as the second term and is of the same sign.

Two special cases of the magnitude of the relative time delay between the extraordinary and ordinary optical waves are of significance. In the first case, the crystal length and the birefringence are chosen such that the relative time delay is on the order of one-half period at the optical carrier frequency. The effect of the birefringent crystal is then to change the polarization of the incident signal. For instance, a crystal such that $t_e - t_0 = 1/4 f_c$ is referred to in optics terminology as a quarter waveplate and will change a linearly polarized signal into a circularly polarized signal. The length of a crystal of calcite corresponding to this time delay is about 0.83 micron at a carrier frequency of 6328 Angstroms.

In the second case, the crystal length and birefringence are such that the relative time delay is on the order of one-half period at the modulation frequency. In this case, the effect of the birefringent crystal will be to modify the time dependence of the polarization envelope of the incident signal. The term "polarization envelope" is used herein to mean the locus that the optical $\overline{E}$ vector traces out during a single optical cycle. Although the polarization envelope of a monochromatic signal is independent of time, that of a modulated signal varies at the modulation frequency in much the same manner as does the "beat envelope" of a modulated scalor signal. The particular form of the polarization envelope variation depends on the relative phase, amplitude, and polarization of each of the sidebands which comprise the signal. It will be assumed herein that the relative time delay introduced by the crystal is significant with respect to the period of the modulation frequency. Since the sidebands are spaced a modulation frequency apart, the changes in the respective polarizations and phases of the various sidebands will be significantly different upon passage through the crystal. Therefore, a change in the time variation of the polarization envelope will result. For reference purposes, it is noted that a calcite crystal whose length is 7.9 centimeters has a relative time delay equal to one-half period at a modulation frequency of 10 gigacycles.

With the foregoing background information in mind, attention is now called to FIGURE 2 which illustrates a preferred embodiment of the present invention useful for demodulating phase modulated light signals. As noted, demodulation is accomplished by converting a phase modulated light signal into an amplitude modulated light signal which is subsequently detected in a nearly lossless manner. The embodiment of the invention in FIGURE 2($a$), in addition to performing its primary function, will simultaneously suppress or balance out any incident amplitude modulated light signals.

The preferred embodiment of a birefringent demodulator in accordance with the present invention, as shown in FIGURE 2($a$), includes an input polarizer 12, a discriminator crystal 14, a bias control mechanism 16, a phase shift crystal 18, and a polarization insensitive photodetector 20. Both the discriminator and phase shift crystals 14 and 18 are birefringent and are cut with their optic axes perpendicular to their length and with their end faces flat and parallel. The orientations of the principal axes of the components are indicated by the dotted lines.

The function of the polarizer is of course to polarize the phase modulated input signal along the X axis. The discriminator crystal 14 is provided to convert the polarized phase modulated light signal from the polarizer 12 into two orthogonal amplitude modulated signals that are 180° out of phase at the modulation frequency. The phase shift crystal 18 is provided to correct the 180° phase shift between the amplitude modulated light signals. The bias control mechanism 16 provides a fine control of the optical polarization preceding the phase shift crystal 18 and thereby in essence determines the operating point on the discriminator characteristic.

More particularly, the bias control mechanism 16 provides a means of varying the relative time delay along the principal axes of the discriminator crystal by very small amounts, on the order of one-half period or less at the optical carrier frequency. This function can be accomplished internally within the discriminator crystal by thermal means, or more practically externally to it by means of various combinations of rotatable retardation plates.

In the operation of the apparatus of FIGURE 2($a$), consider that a phase modulated light signal whose electric field strength is given by $$E = \cos [\omega_c t + m_p \sin \omega_m t] \quad (2)$$

is incident on the polarizer 12. In Equation 2, $\omega_c$ and $\omega_m$ respectively represent the carrier and modulation frequencies and $m_p$ represents the peak phase deviation. The light signal out of the polarizer 12 will be linearly polarized along the X axis of FIGURE 2($b$).

After passing through the discriminator crystal 14 and bias control mechanism 16, the signal, when considered in the primed coordinate system shown in FIGURE 2($b$), is seen to consist of two orthogonally polarized phase modulated signals which are delayed with respect to each other by a time interval expressed by Equation 1. The instantaneous phases of these waves are given by $$\begin{aligned}\phi_{x'} &= \omega_c(t-t_0) + m_p \sin \omega_m(t-t_0)\\ \phi_{y'} &= \omega_c(t-t_e) + m_p \sin \omega_m(t-t_e)\end{aligned} \quad (3)$$

where $t_0$ and $t_e$ are the transit times through the crystal and bias control mechanism of the ordinary and extraordinary waves respectively. To simplify the present discussion, it will be assumed that the discriminator crystal 14 is chosen such that the time delay between these orthogonally polarized signals is one-half period of the modulation frequency, i.e. $\omega_m(t_0 - t_e) = \pi$, and that the bias control mechanism has been adjusted such that the carrier is circularly polarized i.e. $\omega_c(t_0 - t_e) = \pm q(\pi/2)$ where $q$ is an odd integer. With these conditions, the instantaneous phase difference between their orthogonally polarized phase modulated signals at the output of the bias control mechanism is $$\phi_{x'} - \phi_{y'} = \pm q\pi/2 + 2m_p \sin \omega_m t \quad (4)$$

where since average time delay is not of importance, the time origin has been shifted to a convenient position. The polarization envelope of this signal is a time varying elipse which fluctuates at the modulation frequency about a condition of circular polarization. In FIGURES 3($a$)–($b$), the variation of this polarization envelope is shown for part of a modulation frequency cycle. For simplicity, $m_p = \pi/4$ has been assumed. The location of the major and minor axes of the ellipse is time independent, and as seen in FIGURES 3($a$)–($b$), is along the XY axes, i.e. at 45° to the principal axes of the discriminator crystal 14 and aligned with the principal axes of the phase shift crystal 18.

It is a particularly important aspect of the invention that if the time varying polarization envelope shown in FIGURES 3($a$)–($b$) is considered in the coordinate system of its own major and minor axes (rather than in the coordinate system of the principal axes of crystal 14) it is seen that it is composed of two amplitude modulated, rather than two phase modulated, signals. More particularly, the discriminator crystal and bias control mechanism 14 and 16 respectively, provide two orthogonally related phase modulated signals along their aligned principal axes. If these two signals however are considered with respect to a set of axes shifted by 45°, then these signals comprise two amplitude modulated signals which are 180° out of phase at the modulation frequency and an odd multiple of $\pi/2$ radians out of phase at the carrier frequency.

The fact that the two phase modulated signals constitute two amplitude modulated signals about a different set of axes can be seen by considering FIGURES 3(*a*)–(*b*) and supposing that the bias control mechanism is followed by a linear polarizer oriented along the X axis. It is apparent that the signal transmitted through such a polarizer will be amplitude modulated inasmuch as the amplitude of the polarization envelope along the X axis varies during the modulation cycle as shown in FIGURES 3(*a*)–(*b*). Next, suppose this polarizer to be rotated by 90°, such that it is oriented along the Y axis of FIGURES 3(*a*)–(*b*). Again, an amplitude modulated signal will be obtained and will differ by 180° at the modulation frequency from that obtained with the polarizer in its initial orientation. It is clear then that in order to form an amplitude modulated resultant of these two orthogonally related amplitude modulated signals, it is necessary that the phase shift crystal 18 be oriented such that its principal axes are along the major and minor axes of the elipse shown in FIGURES 3(*b*), (*d*), and (*f*) (i.e. shifted by 45° with respect to the principal axes of the discriminator crystal 14 and bias control mechanism 16) and in addition that it be able to correct the 180° phase difference between the orthogonally polarized amplitude modulated signal introduced by crystal 14. When its relative time delay corresponds to 180° at the modulation frequency, it will provide an amplitude modulated output signal which comprises the resultant of the two orthogonally related amplitude modulated signals which resultant signal has an amplitude which varies in accordance with the phase of the phase modulated input signal applied to the polarizer 12. Thus, from the foregoing, it should be appreciated that an apparatus has been shown for demodulating phase modulated light signals.

As previously noted, the apparatus will in addition suppress amplitude modulated light signals incident on the polarizer 12. Consider that the discriminator crystal 14 has a relative time delay corresponding to 180° at the modulation frequency. Consequently, the incident amplitude modulated light signal will consist of two orthogonal amplitude modulated light signals at the discriminator crystal output (polarized along the $x'$ and $y'$ axes) which are 180° out of phase at the modulation frequency and therefore the total light intensity will no longer contain any modulation component at the fundamental modulation frequency. Thus, the discriminator crystal by itself, when of proper length, will completely balance out an amplitude modulated signal. In general, however, the discriminator crystal will not be of optimum length, and some amplitude modulation will remain at its output. In this case, the phase shift crystal will continue the suppression in a manner similar to that of the discriminator crystal. If the discriminator crystal 14 is of optimum length, then no bias adjustment is necessary for complete AM suppression, but if the phase shift crystal 18 must aid in the suppression, then the bias control mechanism should be adjusted such that the carrier is circularly polarized. It is further pointed out that if the relative time delay of both crystals corresponds to 180° at the modulation frequency, and if the bias control mechanism is adjusted for circular polarization, then the AM suppression is a result of a complete AM to PM conversion. This statement follows in that the two orthogonally polarized AM signals along the $x'y'$ axes at the input of the phase shift crystal, may alternately be considered as two PM signals which are polarized along the XY axes and which are out of phase by 180° at the modulation frequency. In fact, the variation of the polarization envelope versus time for this case is the same as that of FIGURES 3(*a*)–(*b*) with the principal axes of all of the elipses rotated by 45°. The phase shift crystal then corrects this 180° phase difference, with the result that the optical signal at its output is purely phase modulated.

From the foregoing, it should be appreciated that the structural configuration of a birefringent demodulator for demodulating phase modulated light has been disclosed. A rigorous mathematical analysis of the disclosed apparatus and summary of experimental results are provided in a paper authored by one of the inventors, S. E. Harris, entitled "Demodulation of Phase Modulated Light Using Birefringent Crystals" which appeared in the Proceedings of the IEEE, volume 52, number 7, July 1964. In that paper, the curves of FIGURES 4(*a*) and (*b*) which respectively express the phase modulation conversion efficiency and amplitude modulation suppression efficiency of the apparatus of FIGURE 2(*a*) are developed. The term $f_m$ employed on the X axis of the charts of FIGURES 4(*a*) and (*b*) of course indicates the modulation frequency and the term $f_0$ is defined by $$f_0 = f_{01} = f_{02}$$

where $f_{01}$ and $f_{02}$ respectively are the modulation frequencies for which the discriminator and phase shift crystals are of optimum length. It can thus be seen that where the crystals are chosen such that $f_{01}$ and $f_{02}$ are equal to the modulation frequency, the conversion of phase modulated light to amplitude modulated light is nearly complete as is the suppression of incident amplitude modulated light.

FIGURE 5(*a*) illustrates an alternative embodiment of the invention which is the same as the embodiment of FIGURE 2 except however a particular means of biasing is employed which includes an optical quarter waveplate whose principal axes are fixed at 45° to the principal axes of the discriminator crystal. The bias can be controlled by rotating the phase shift crystal about its longitudinal axis. It can be shown that irrespective of the retardation of the discriminator crystal, the optical carrier will be linearly polarized on emerging from the quarter waveplate and that the correct angle of the phase shift crystal is such that its principal axes are at 45° to this linear polarization. Bias control can be very easily exercised in that a full rotation of the phase shift crystal, in effect, changes the retardation of the discriminator crystal by only two wavelengths at the optical carrier frequency. Thermal changes in the discriminator crystal can therefore be readily compensated for.

From the foregoing, it should be appreciated that a birefringent demodulator has been shown herein which has been demonstrated to be efficient for the demodulation of phase modulated light. Besides its applicability to optical communication, it may additionally find use in the study of physical effects which lead to the modulation of the refractive index of a material. It is further significant however in that it suggests that other optical networks may be formed composed of birefringent crystals. Such other optical networks can for example comprise equalizers, linear discriminators, and frequency selective hybrids.

Although each of the embodiments herein has been illustrated as including a polarizer 12 for polarizing the input light signal, it should be appreciated that the polarizer is not necessary if the input signal is already polarized. In addition, although the signal applied to the discriminator crystal has been disclosed as being linearly polarized, it is pointed out that it could alternatively be elliptically polarized such that one of the principal axes of polarization coincides with the direction indicated for the linear polarizer 12.

What is claimed is:

1. Apparatus for demodulating a phase modulated light signal comprising first means for linearly polarizing said light signal; second means responsive to said linearly polarized light signal for developing first and second orthogonally related signals polarized along a first set of axes and delayed with respect to one another; third means responsive to said first and second signals about a second set of axes shifted with respect to said first set of axes and including means for correcting said delay for providing an output signal whose amplitude varies as the phase of said phase modulated light signal.

2. Apparatus for demodulating a phase modulated light signal comprising first means for linearly polarizing said light signal; a first birefringent crystal having a first set of principal axes; a second birefringent crystal having a second set of principal axes; means orienting said first means and said first birefringent crystal such that said linearly polarized light signal is transmitted through said first birefringent crystal to develop first and second phase modulated signals coincident with said first set of axes and out of phase with respect to one another by $\Delta\phi$; means positioning said second birefringent crystal to receive said first and second signals and orienting it with respect to said first birefringent crystal such that said second set of principal axes is displaced from said first set of principal axes, said second birefringent crystal having a length and indices of refraction for shifting the relative phase between said first and second signals by $-\Delta\phi$.

3. Apparatus for converting a phase modulated light signal having carrier and modulation frequency components into an amplitude modulated signal comprising first means for linearly polarizing said light signal along a first axis; first birefringent means defining a second set of principal axes each displaced by substantially 45° from said first axis; second birefringent means defining a third set of principal axes displaced by substantially 45° from said second set of principal axes; means transmitting said phase modulated light signal through said first means and said first birefringent means for developing first and second orthogonally related signals polarized coincident with said second set of principal axes and phase delayed with respect to one another; and means transmitting said first and second signals through said second birefringent means for developing an output signal whose amplitude varies as the phase of said phase modulated signal.

4. The apparatus of claim 3 wherein said first birefringent means has a length and indices of refraction for shifting the phase of said first and second signals relative to one another by substantially 180° at said modulation frequency.

5. The apparatus of claim 4 wherein said first birefringent means includes an adjustable bias means for selectively varying said phase delay introduced thereby.

6. The apparatus of claim 3 wherein said second birefringent means has a length and indices of refraction for shifting the phase of said first and second signals relative to one another by substantially 180° at said modulation frequency.

7. Apparatus for converting a phase modulated light signal having carrier and modulation frequency components into an amplitude modulated signal comprising first means for linearly polarizing said light signal along a first axis; first birefringent means defining a second set of principal axes each displaced by substantially 45° from said first axis; second birefringent means defining a third set of principal axes displaced by substantially 45° from said second set of principal axes; means transmitting said phase modulated light signal through said first means and said first birefringent means for developing first and second orthogonally related signals polarized coincident with said second set of principal axes and phase delayed with respect to one another; means transmitting said first and second signals through said second birefringent means for developing an output signal whose amplitude varies as the phase of said phase modulated signal; polarization insensitive photodetector means; and means applying said output signal to said photodetector means.

8. Apparatus for demodulating a polarized phase modulated light signal comprising first means responsive to said light signal for developing first and second orthogonally related signals polarized along a first set of axes and delayed with respect to one another; second means responsive to said first and second signals about a second set of axes shifted with respect to said first set of axes and including means for correcting said delay for providing an output signal whose amplitude varies as the phase of said phase modulated light signal.

9. Apparatus responsive to a polarized phase modulated light signal having a principal axis coincident with a first axis for forming an amplitude modulated signal comprising first birefringent means defining a second set of principal axes each displaced by substantially 45° from said first axis; second birefringent means defining a third set of principal axes displaced by substantially 45° from said second set of principal axes; means transmitting said phase modulated light signal through said first birefringent means for developing first and second orthogonally related signals polarized coincident with said second set of principal axes and phase delayed with respect to one another; and means transmitting said first and second signals through said second birefringent means for developing an output signal whose amplitude varies as the phase of said phase modulated signal.

References Cited

UNITED STATES PATENTS 2,418,964 4/1947 Arenberg.
3,234,475 2/1966 Giordmaine et al.
3,304,428 2/1967 Peters.
3,324,295 6/1967 Harris ---------- 329—144 X ALFRED L. BRODY, *Primary Examiner.*